Sept. 21, 1965　　　M. VANZO ETAL　　　3,207,019
MACHINE FOR SHEARING SHEET MATERIAL
Filed March 5, 1962　　　　　　　　　　　9 Sheets-Sheet 1

INVENTORS
Marcello Vanzo &
BY Giovanni Ermanno Colombo
Stevens, Davis, Miller & Mosher
ATTORNEYS

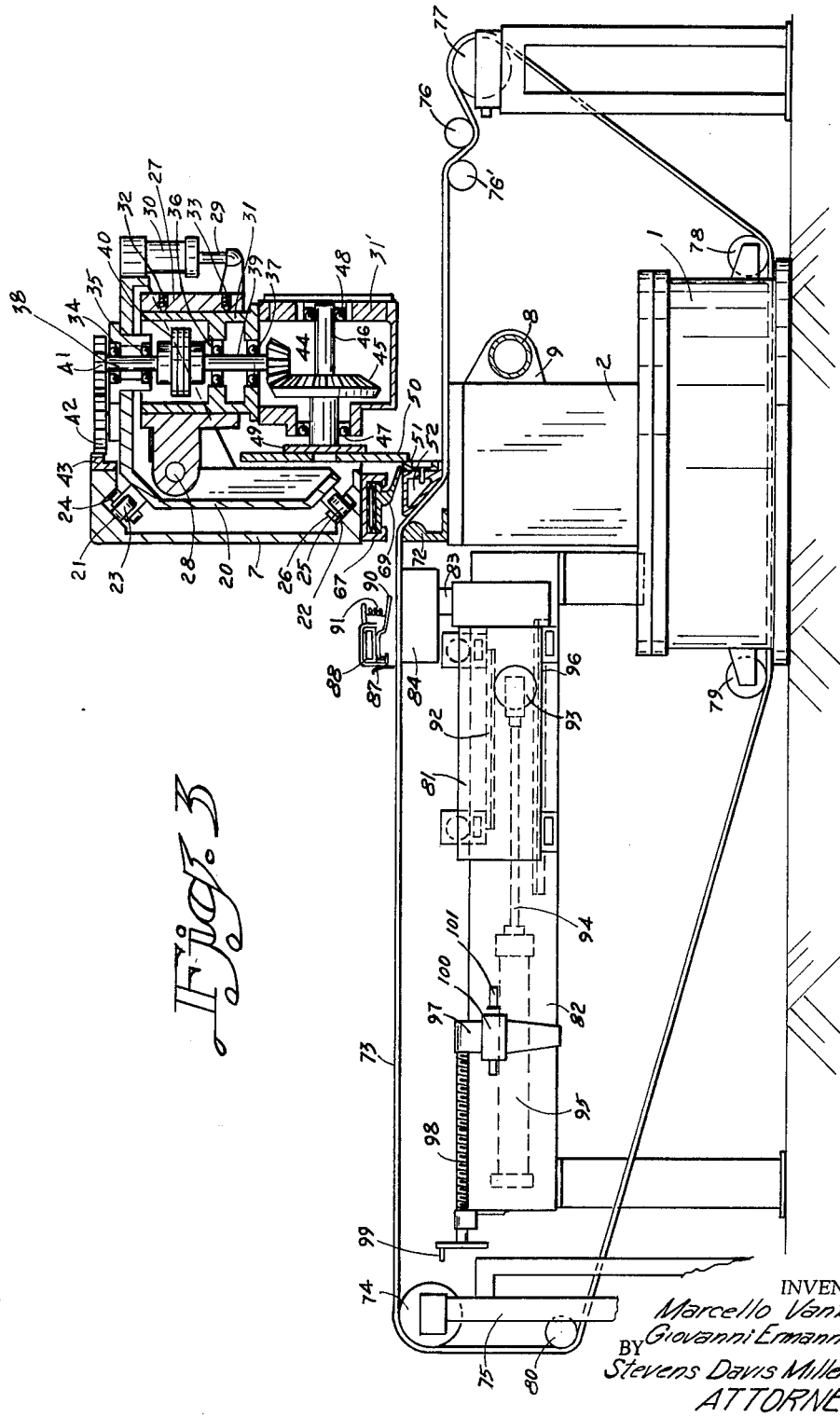

Sept. 21, 1965 M. VANZO ETAL 3,207,019
MACHINE FOR SHEARING SHEET MATERIAL
Filed March 5, 1962 9 Sheets-Sheet 4
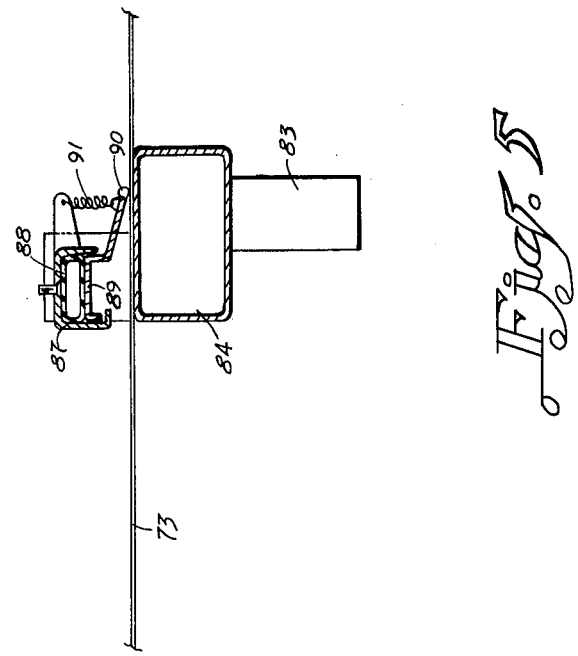
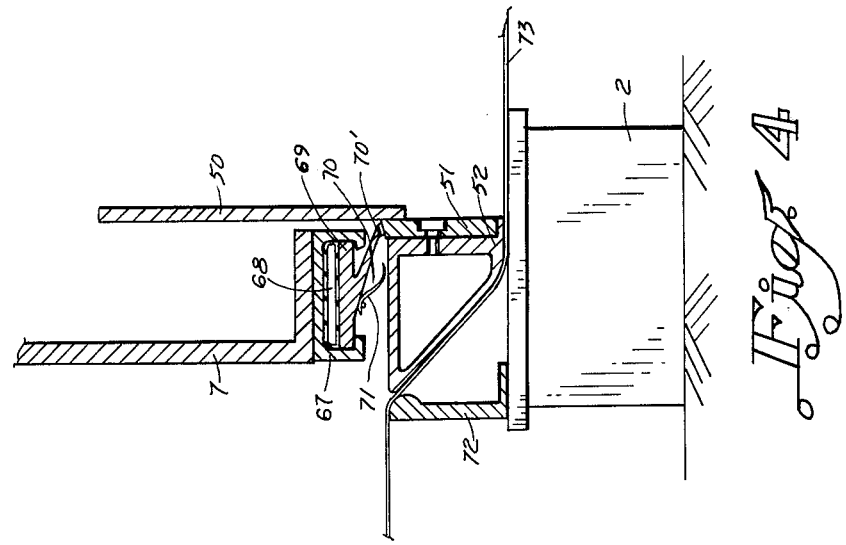
INVENTORS
Marcello Vanzo &
Giovanni Ermanno Colombo
BY
Stevens, Davis, Miller & Mosher
ATTORNEYS

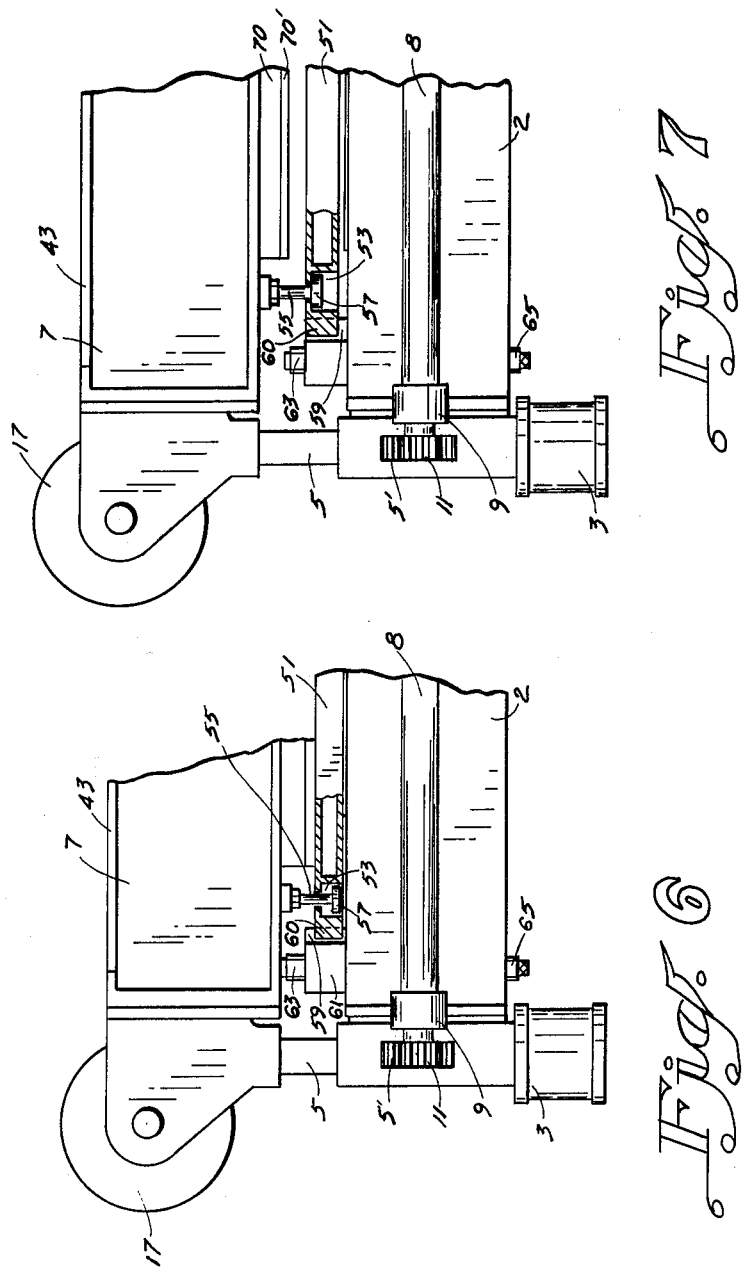

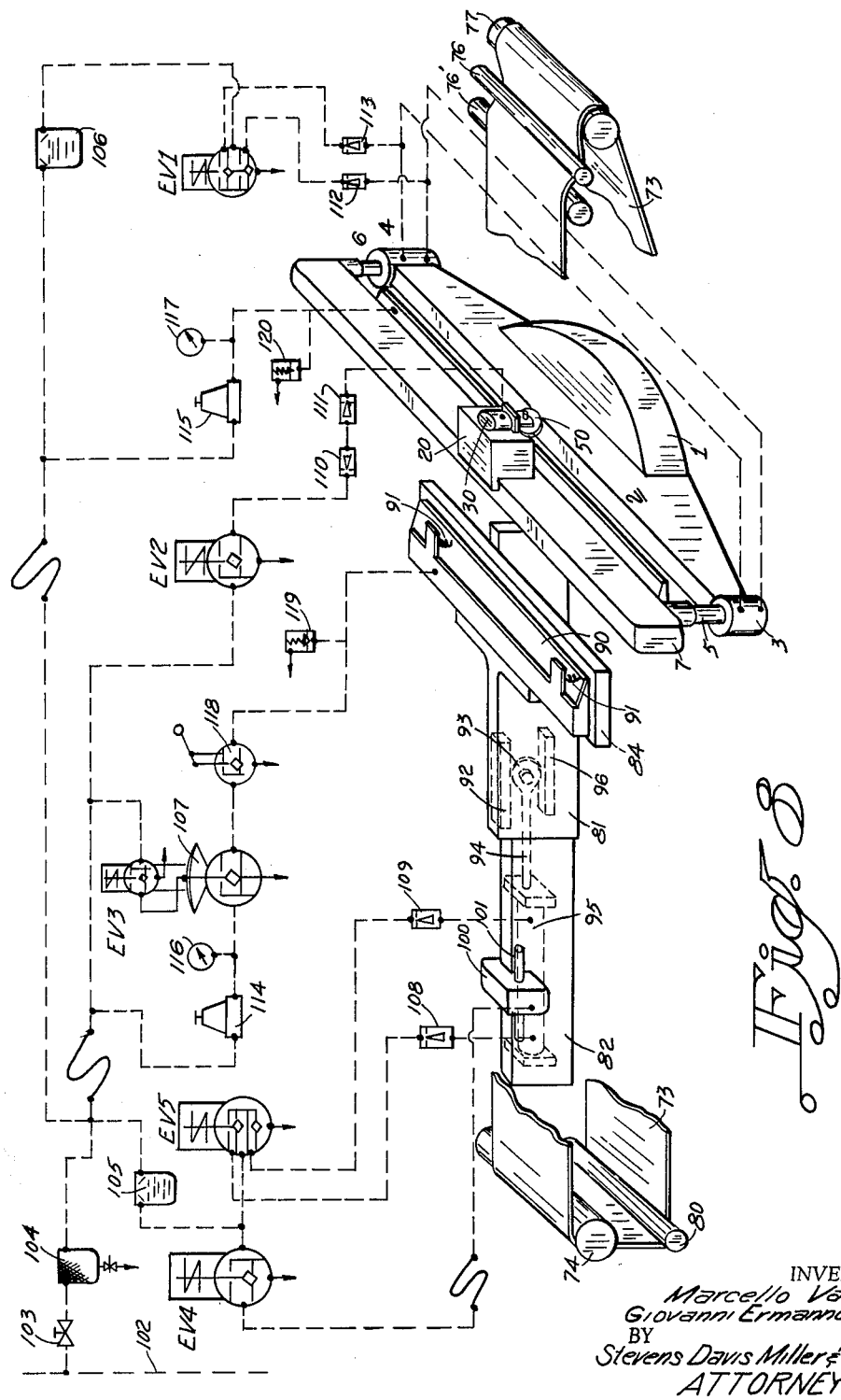

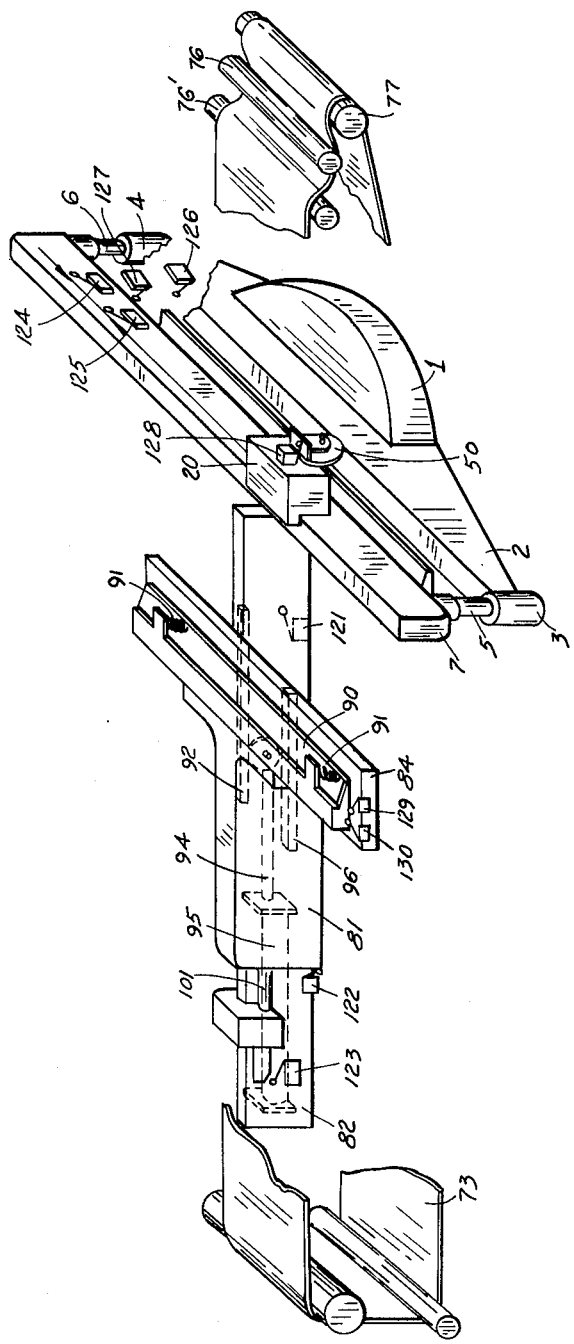

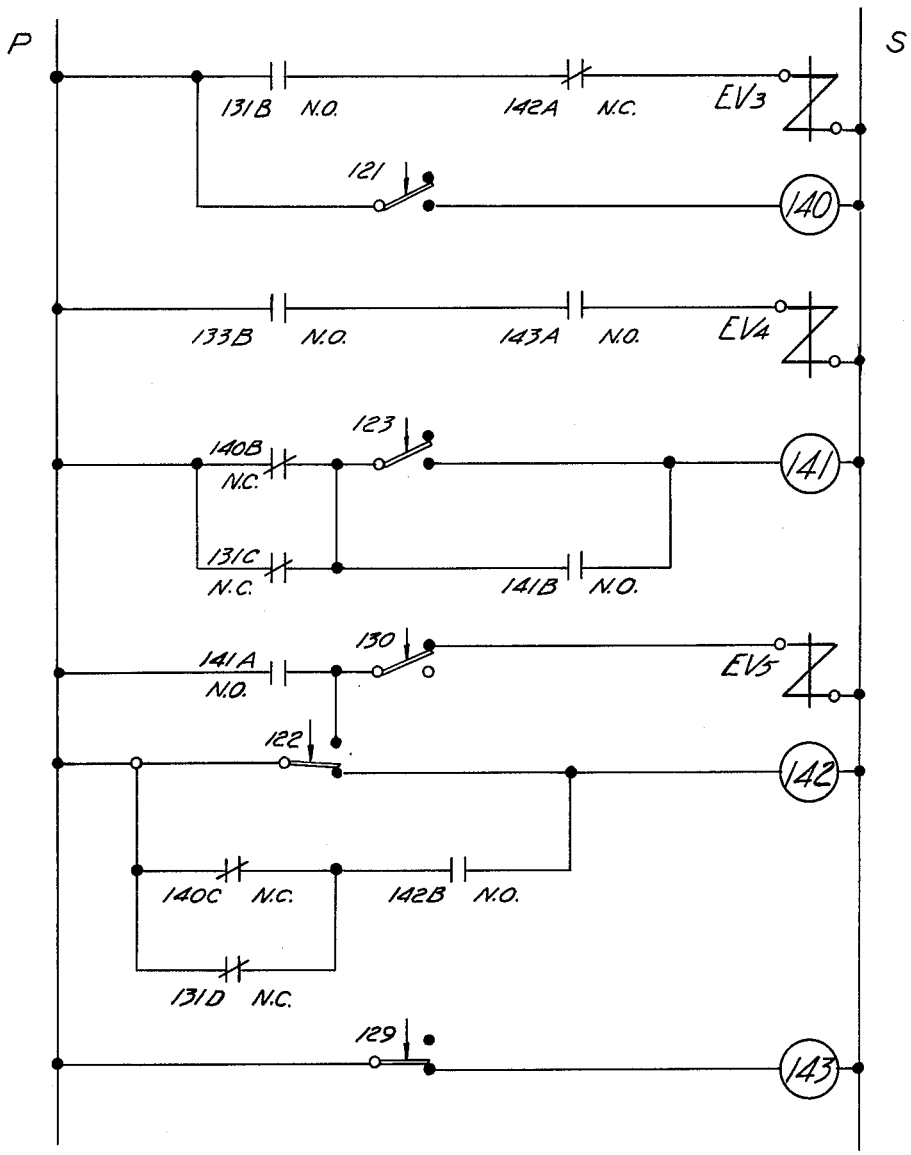

United States Patent Office 3,207,019
Patented Sept. 21, 1965

3,207,019
MACHINE FOR SHEARING SHEET MATERIAL
Marcello Vanzo, Milan, and Giovanni Ermanno Colombo, Legnano, Milan, Italy, assignors to Pirelli S.p.A., Milan, Italy
Filed Mar. 5, 1962, Ser. No. 177,269
Claims priority, application Italy, Mar. 11, 1961, 4,576/61
16 Claims. (Cl. 83—277)

The present invention relates to a machine for shearing sheet material, especially sheet material provided with reinforcing insertions. For example, the sheet material referred to herein may be the so-called "cord fabric," namely, fabric constituted of filiform elements parallel to one another and held together by means of uncured rubber or of similar elastic or plastic materials. More particularly, the machine of the present invention is designed for cutting this sheet material on the bias, at various angles, and along very extended cutting lines.

The machine of the present invention can be employed advantageously to shear cord fabric constituted of metal cords, particularly cords made of high strength steel, such as those employed in the manufacture of tires.

Generally speaking, there are three well known and different systems employed for cutting sheet material, namely, (1) sharp rotary blades, (2) guillotine shears and (3) shearing machines.

The sharp rotary blade system consists substantially in using a circular blade having a sharp edge and rotating at a very high speed. This system is normally adopted for cutting materials having a low strength, such as paper and textiles, but cannot be adopted for cutting metallic materials because the cutting edge of the blade wears out rapidly when in contact wtih the latter materials.

The guillotine shears system can be used for cutting low strength materials and can also be used for cutting metal plates; however, this system is not suitable for cutting hard material which is, at the same time, flexible, because the upper blade, as a result of the hardness of the material to be cut, undergoes a lateral deflection in the region of its central zone. The upper blade, thus deviating from the counterblade in this central zone, allows the material to penetrate between the blades, thereby creating a faulty cut in this zone. This phenomenon is particularly serious in the case of metal cord fabrics, such that the individual cords are displaced in the plane of the fabric and in planes normal thereto.

The present invention provides a shearing machine embodying a cutting system substantially of the shearing type which effects very extended cuts and which will operate on sheet material of high rigidity as well as of heterogeneous properties, especially on metal cord fabric, without incurring the above mentioned drawbacks and disadvantages.

A principal object of the present invention is to provide a machine comprising a shearing device constituted by a circular blade rotatable on its own axis and movable in the cutting direction and by a rectilinear counter-blade. This shearing device is further characterized in that the circular blade has a peripheral speed which is slightly higher than its traverse speed and in that the plane of this circular blade forms a small angle with respect to the plane of the rectilinear blade, the axis of the circular blade, however, remaining in a plane substantially perpendicular to the plane of the rectilinear blade and at a distance from the edge of the counter-blade which is smaller than the radius of the circular blade.

A further object of the present invention is to provide a machine capable of carrying out bias cutting at a wide range of angles.

A still further object of the present invention is to provide a suitable feeding mechanism for conveying the sheet material to and maintaining it in the cutting zone under the optimum conditions for the cutting operation.

A still further object of this invention is to provide a suitable means for insuring an exact correspondence between the size of the cut strips and the predetermined size thereof.

Other and further objects and advantageous features of the present invention will hereinafter more clearly appear from a detailed description of the attached drawings in which FIGURE 1 is a front elevation of a machine constructed in accordance with the present invention;

FIGURE 3 is a side elevation of the machine shown in FIGURE 1 with certain parts broken away and certain parts in section;

FIGURE 4 is a fragmentary sectional view, on an enlarged scale, of the shearing components and associated elements;

FIGURE 5 is a fragmentary sectional view showing details of the clamp for feeding the fabric;

FIGURE 6 is a partial front elevation of the left hand portion of the machine, with certain parts in section, and showing particularly the upper ledger in its lowered position;

FIGURE 7 is a view similar to that of FIGURE 6 showing the upper ledger in a lifted position;

FIGURE 8 is a diagrammatic perspective view of the basic operating components of the machine included in association with a diagrammatic representation of the pneumatic system employed therewith;

FIGURE 9 is a diagrammatic perspective view similar to FIGURE 8 without the pneumatic diagram, but including a showing of the limit stops; and FIGURES 10 and 11 together represent a diagrammatic illustration of the electrical components and circuitry employed for operating the machine of the present invention.

Figure 1:
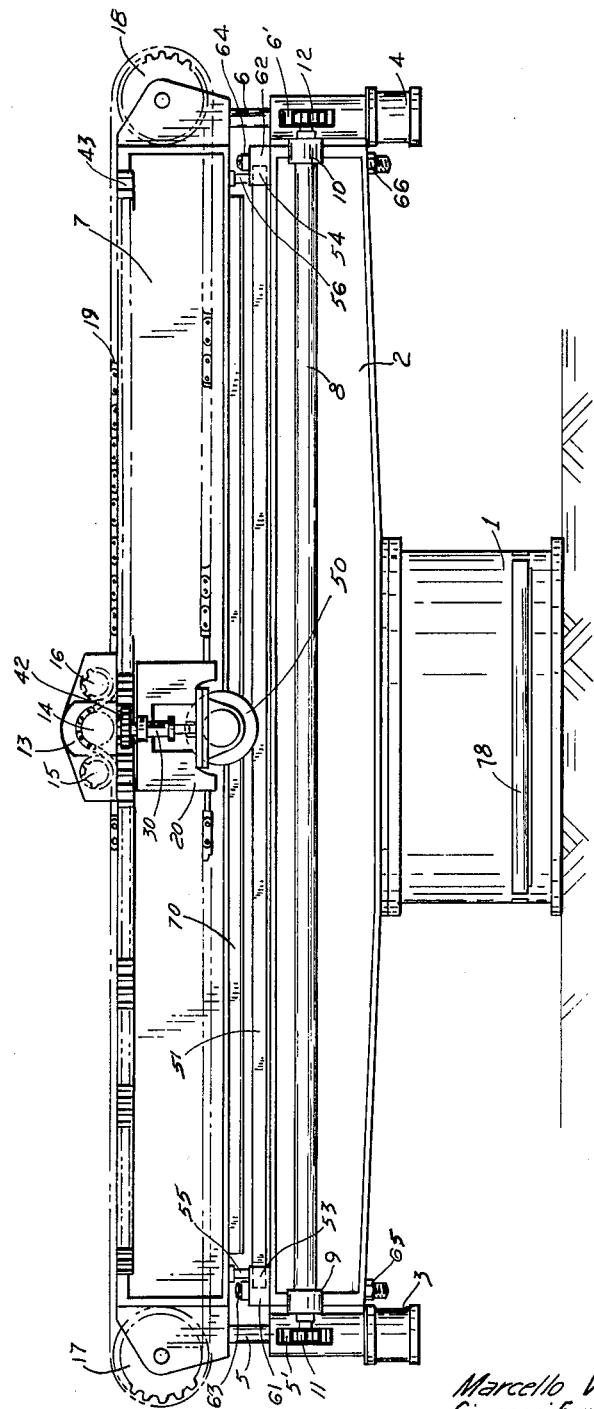
Figure 2:
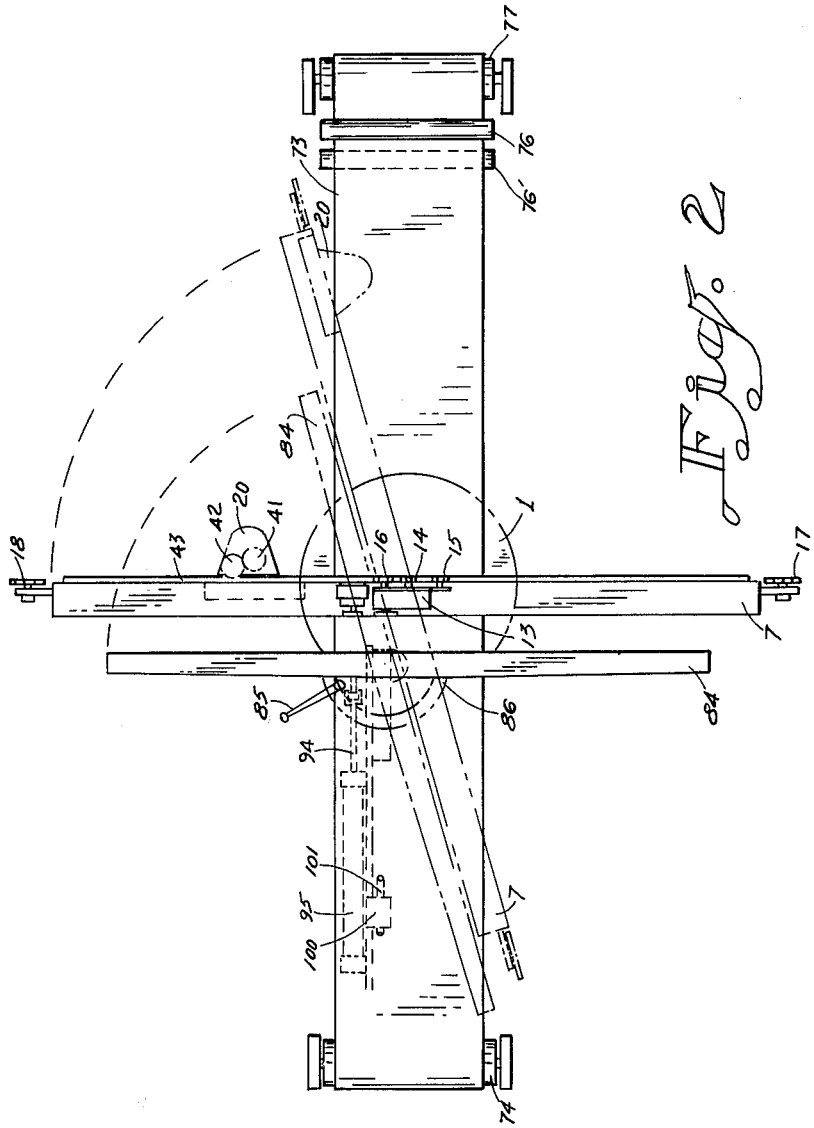
FIGURE 2 is a plan view of the machine shown in FIGURE 1, with the possible movement of the shearing means and the feeding means being indicated by the dotted lines.

Referring to the drawings in detail, FIGURE 1 shows a cylindrical base 1 upon which is rotatably mounted a lower ledger 2. At the ends of the lower ledger there are mounted double-acting vertical cylinders 3 and 4 within which two pistons (not shown), respectively, are slidably received. The piston rods 5 and 6 which are attached to the two pistons respectively are shown projecting upwardly from the cylinders 3 and 4 such that the upper ends of these piston rods are integral with a second and upper ledger 7. For the purpose of maintaining the upper ledger 7 in parallelism during its vertical displacement, a horizontal tube 8 is rotatably mounted in the supports 9 and 10. The ends of the tube 8 are provided with gear segments 11 and 12 which mesh with two rack portions 5' and 6' on the piston rods 5 and 6, respectively. On the upper central part of the upper ledger 7 there is shown a motor 13 (which includes its own speed reduction means), a sprocket gear 14 and two additional sprocket gears 15 and 16 located on opposite sides of the sprocket gear 14. Two idler sprocket wheels 17 and 18 are mounted for rotation at the opposite ends of the upper ledger 7. A chain 19 whose ends are fastened to the opposite sides of a carriage 20, thereby forming a closed ring, passes around the sprockets 14, 15, 16, 17 and 18 such that, as the sprocket 14 is turned in one direction or the other by the motor 13, the carriage 20 will be moved toward the right or left along the length of the upper ledger 7.

As best shown in FIGURE 3 the carriage 20 is mounted for horizontal sliding movement along the upper ledger 7, the latter being provided with guides 21 and 22, each of which comprises two rolling surfaces disposed at ninety degrees with respect to each other. The carriage 20 is provided with an upper pair of small wheels 23 and 24 which rotate on axes disposed at ninety degrees with respect to each other such that the outer surfaces of these wheels bear against the two rolling surfaces of the guide 21; the carriage 20 is similarly provided with a pair of lower small wheels 25 and 26 which are also disposed at ninety degrees with respect to each other so as to contact the two rolling surfaces of the guide 22.

The carriage 20 includes a collar 27 which is pivotally attached at one side to the carriage by means of a pivot 28. The other side of the collar 27 is hingedly connected to the lower end of a piston rod 29. The piston rod 29 is connected at its upper end to a piston (not shown) which is slidably mounted within the single-acting vertical cylinder 30, the later being secured at its upper end to the carriage 20. The upward stroke of the piston is opposed by a compression spring (not shown) situated in the upper portion of the cylinder 30. The collar 27 is locked against a bushing 31 by means of screws 32 and 33 which are employed for adjusting the position of the bushing.

Two spindles 38 and 39 which are connected together by means of a flexible coupling 40 are mounted inside the bushing and assembled on the ball bearings 34, 35, 36 and 37. The upper portion of the spindle 38 carries a gear 41, which, by means of a ratchet device (the details of which are conventional and hence, are not shown), will rotate idle in one direction; when the gear 41 rotates in the opposite direction it causes rotation of the spindle 38. The gear 41 meshes with another gear 42, also mounted on the carriage, gear 42 engaging a rack 43 extending along the upper portion of the upper ledger 7. A bevel gear 44 keyed at the lower end of the spindle 39 meshes with a bevel gear 45 which is keyed on a shaft 46. The shaft 46 is rotatable in ball bearings 47 and 48 which are supported in the housing 31'; the latter being attached to the lower end of the bushing 31.

At the left hand end of the shaft 46 (as it appears in FIGURE 3), there is keyed a disc 49 which is secured to a circular blade 50 by means of screws (not shown) or other suitable means. The circular blade 50 has a small side rake on each of its plane surfaces, thereby permitting the blade to be used on both sides. In the shearing operation, the blade 50 cooperates with a rectilinear counter-blade 51 (see also FIGURE 4) which is mounted on a beam 52 extending for practically the entire length of the upper ledger.

As best shown in FIGURES 1, 6 and 7, the ends of the beam 52 are provided with cavities 53 and 54 in which are slidably received two studs 55 and 56. The upper ends of the studs 55 and 56 are connected to the upper ledger 7 and the lower ends of these studs are provided with enlarged portions 57 which bear against the upper ends of the recesses 53 and 54 when the upper ledger is lifted. When the upper ledger 7 is lifted, the studs 55 and 56 will also lift the beam 52 and the counter-blade 51, as best shown in FIGURE 7. Two blocks 61 and 62 which are fastened to opposite ends of the lower ledger 2 are each provided with a vertical guide 59. The opposite ends of the beam 52 are provided with narrow extensions 60 which are slidably received within the vertical guides 59. Two set screws 63 and 64 pass through the blocks 61 and 62. The height of these set screws can be adjusted by means of nuts 65 and 66 so as to establish the lowermost position of the upper ledger 7. Thus, after the cutting process has been performed, the fluid system is energized (as will be described below) and the upper ledger 7 is lifted. Teeth 70' are provided to contact and hold the material to be cut, as described below. During the lifting of ledger 7, teeth 70' become disengaged from the material to be cut after which enlarged portions 57 cause a lifting force to be applied to the upper surfaces of recess 53, resulting in a lifting of the counter-blade 51. The lifting of counter-blade 51 is directed and influenced by the guide portion of vertical guides 59. As the counter-blade 51 is lifted, the beam 52 becomes disengaged from the conveyor belt 73. After the next sheet of material has been positioned for cutting, the upper ledger 7, counter-blade 51 and beam 52 are lowered into position and beam 52 comes into contact with said conveyor belt. Since the material to be cut may contain rubber not yet cured and which may be in a plastic state, teeth 70' must be prevented from excessively squeezing said material and causing permanent deformation thereto. This is accomplished by providing a lower limit for upper ledger 7, said lower limit being established by set screws 63 and 64 which are mounted in blocks 61 and 62 and whose height is adjusted by means of nuts 65 and 66 for the establishment of a lowermost position of upper ledger 7.

Referring particularly to FIGURE 4, a C-shaped profile bar 67 is attached to the lower edge of the upper ledger 7. An air bag 68 is encased within the cavity of the profile bar 67 together with and disposed above a bar 69. The bar 69 is provided with a lug 70 extending to a region adjacent the cutting line between the rotary blade 50 and the counter-blade 51. The lug 70 is provided with a plurality of equidistant teeth 70' along its lower edge. The lower face of the bar 69 is provided with a plurality of springs 71 which serve to facilitate the detachment of the teeth 70' from the sheet material after the shearing operation.

Referring now to FIGURES 3 and 4, a continuous conveyor belt 73 is provided for feeding the sheet material to be sheared. An L-shaped profile bar 72 is attached to the lower ledger 2 adjacent the beam 52. The belt 73 passes over a roller 74 which is freely rotatably mounted on a support 75, over the L-shaped deflector 72, through a pair of self-centering rollers 76 and 76', over a roller 77, beneath a pair of rollers 78 and 79, and, finally, around a further idler roller 80 mounted on the support 75 and returning to the roller 74. The rollers 76, 76' and 77 are suitably mounted in the right hand end of the machine as it appears in FIGURE 3, and the rollers 78 and 79 are suitably mounted on the base 1.

A frame 82 is located beneath the conveyor belt 73 and a carriage 81 is slidably mounted along this frame for actuating the conveyor belt. Carriage 81 carries a pivot 83 upon which is mounted a rotatable ledger 84. This ledger can be locked in the desired angular position by means of a stop 85 which is adapted to engage any suitable groove in a circular sector 86. The ledger 84 carries a C-shaped profile bar 87 (see also FIGURE 5) which extends over the belt 73. The cavity of the C-shaped profile bar encases an air bag 88 and a profile bar 89. The profile bar 89 is provided with an extension 90 connected to the profile bar 87 by means of springs 91. The carriage 81 is provided with a rack 92 meshing with a gear 93 secured to the outer end of a piston rod 94. The rod 94 is attached at its other end to a piston (not shown) which is slidable within a double-acting cylinder 95 which is connected to the frame 82. The gear 93 also meshes with a second rack 96 which is attached to the frame 82 so that a given stroke of the piston rod 94 will produce a double travel of the carriage 81.

For the purpose of adjusting the backward travel of the carriage 81, there is provided a limit stop 97 mounted on a screw 98. The screw 98 is rotatably supported by the frame 82 and is provided with a crank 99 which permits movement of the limit stop 97 along the screw. The limit stop 97 also includes a single-acting cylinder 100 containing a piston (not shown) having an outwardly projecting piston rod 101 which limits the backward travel of the carriage 81 to a length corresponding to that of the fabric strip to be sheared.

Referring now to FIGURE 8, there is shown a pneumatic diagram for the control of the pistons which are slidable in the cylinders 3, 4, 30, 95 and 100 and of the air bag 88. No control is shown for the air bag 68 as the latter is constantly inflated. Reference numeral 102 indicates the piper or source of supply for the compressed air, 103 is a cock, 104 a filter, 105 and 106 are two lubrifiers for the air. EV1 is a four-way electrovalve controlling the vertical movement of the upper ledge 7 in the two directions as follows: when the valve EV1 is not energized, compressed air passes into the lower portions of the cylinders 3 and 4, thereby lifting the upper ledger 7; when the valve EV1 is energized, compressed air is introduced to the upper portions of the cylinders 3 and 4 such that the upper ledger is lowered. EV2 is a three-way electrovalve, normally opened, controlling the approach of the rotary blade 50 to the rectilinear blade 51; when the valve EV2 is not energized, compressed air is introduced into the lower portion of the cylinder 30 tending to move the rotary blade 50 away from the counter-bade 51.

EV3 is a three-way electrovalve controlling the deflation of the air bag 88, the latter being inflated when this valve is de-energized. A diaphragm distributor 107 is associated with the electrovalve EV3.

EV4 is a three-way electrovalve, normally opened, which serves to release compressed air from the cylinder 100, the latter being under pressure when the valve is de-energized.

EV5 is a four-way electrovalve controlling the sliding of the piston in the double-acting cylinder 95; when the electrovalve is de-energized, there is compressed air in the forward end of the cylinder 95.

Reference numerals 108, 109, 110, 111, 112 and 113 indicate flow regulating valves, 114 and 115 indicate pressure reducers, 116 and 117 pressure gauges, 118 a three-way hand distributor, 119 and 120 safety valves.

Figure 10:
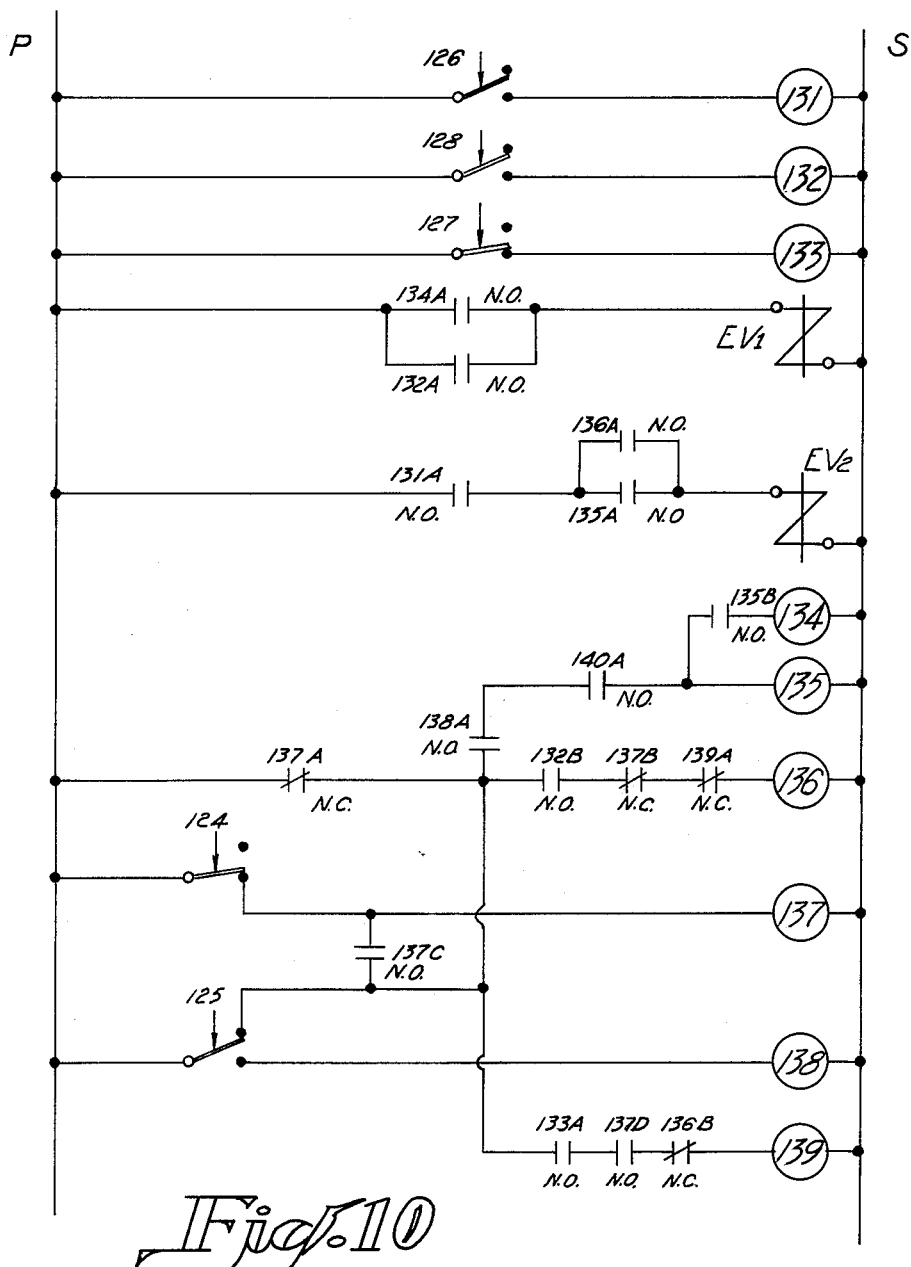

In order to control and co-ordinate the movements of the various parts of the machine, an electrical relay control and regulating system comprising remote control switches has been devised; it comprises a motor 13, the necessary mechanical controls, and the corresponding electrical circuit shown in FIGURES 9, 10 and 11. The motor 13 which is connected in the circuit is a three-phase alternating current motor with a squirrel cage rotor; the motor controls the travel of the carriage 20 in both directions. However, in light of the description appearing above, it should be apparent that the rotatable blade 50 will rotate in only one direction and only during the shearing operation.

The electrical circuit shown in FIGURE 9 comprises the following limit switches whose positions are adjustable in accordance with the desired length and width of the fabric strips to be sheared, and the following microswitches:

The limit switch 121 which limits the travel of the carriage 81 towards the upper ledger 7 and which is actuated by a cam (not shown) on the carriage;

Limit switch 122 which is actuated by a second cam (not shown) mounted on the carriage 81 when the carriage is stopped by the rod 101 during its backward travel away from the upper ledger 7;

Limit switch 123 which is actuated by the rear end of the rod 101 when the carriage 81 is stopped by the limit stop 97 in its further supplementary backward travel;

The limit switch 124 which limits the movement of the carriage 20 in the working direction and which is actuated by a rod (not shown) attached to the carriage;

Limit switch 125 which limits the return movement of the carriage 20 and which is actuated by another rod (not shown) attached to the carriage;

Limit switch 126 limits the downward movement of the upper ledger 7 and which is actuated by a cam (not shown) mounted on the ledger;

Limit switch 127 which limits the upward movement of the upper ledger 7 and which is actuated by another cam (not shown) mounted on said ledger;

Limit switch 128 which is actuated by a cam (not shown) on the collar 27 when the blade 50 is pushed against the blade 51 in the shearing position;

Microswitch 129 which is actuated by the profile bar 89 when the air bag 88 of the clamp is inflated; and Microswitch 130 which is actuated by the profile bar 89 when the air bag 88 is deflated.

In FIGURES 10 and 11, the switches and contacts thereof have been shown in the poistion occupied by them when the machine is in the condition represented by FIGURE 9 and the electric circuit is not energized. The electrical contacts will hereinafter be called "normally open" if they are open when they are at rest and closed when they are actuated; these switches will be designated by the letters "n.o." The electrical contacts will be called "normally closed" and will be designated by the letters "n.c." when they behave in the opposite manner. The arrows appearing on the switches indicate the direction of movement when the switch is actuated or pressed.

In FIGURE 9 the clamp-carrying carriage 81 is in its backward position pushing against the stem or rod 101. Compressed air is in that portion of the cylinder 95 facing the upper ledger 7, since the valve EV5 is de-energized. The limit switch 122 is actuated by the carriage 81. The air bag 88 is inflated since the electrovalve EV3 is de-energized and, therefore, the profile bar 89 actuates the microswitch 129. The cylinder 100 is under pressure, since the corresponding electrovalve EV4 is de-energized. The ledger 7 and the counter-blade 51 are lifted because the electrovalve EV1 is de-energized, thereby supplying compressed air to the lower portions of cylinders 3 and 4. Thus, the ledger 7 actuates the limit switch 127. The circular blade 50 is raised because the corresponding electrovalve EV2 is de-energized such that the cylinder 30 is under pressure. The blade supporting carriage 20 is at the end of its working travel and thus, the limit switch 124 is actuated.

When voltage is applied to the circuit through the lines designated as P and S, the following movements are obtained:

The relay 133 is energized through the limit switch 127 closing the normally open contacts 133A and 133B without causing other operations;

Relay 137 is energized through the limit switch 124 opening the normally closed contacts 137A and 137B and closing the normally open contacts 137C and 137D;

Remote control switch 139 is energized through the limit switch 125, contacts 133A, 137D and 136B, thus, opening the normally closed contact 139A and controlling the motor 13 for reversal of the carriage 20 to the initial position for the shearing operation, at the same time, opening the limit switch 124; however, the relay 137 remains energized through the limit switch 125 and the contact 137C;

The relay 142 is energized through the limit switch 122, thus opening the contact 142A and closing the contact 142B;

Relay 143 is energized through the microswitch 129, thus closing the contact 143A; electrovalve EV4 is energized through contacts 133B and 143A, thus releasing the cylinder 100 and causing the withdrawal of the rod 101 to allow a further backward movement of the carriage 81 as far as the limit stop 97. During this operation (which releases from the shearing zone the edge of the fabric remained adherent to it as the result of a pressure involved during the shearing operation), the limit switch 123 is energized while the limit switch 122 remains actuated;

Relay 141 is energized through contact 140B and limit switch 123, thus closing contact 141A and energizing the electrovalve EV5 through this contact 141A and microswitch 130. Electrovalve EV5 causes the release of compressed air from the cylinder 95 at the end of the cylinder facing the ledger and a simultaneous introduction of compressed air at the opposite end. The clamp supporting carriage, with the clamp in closed position, approaches the ledger 7 carrying with it the fabric to be sheared and the underlying conveyor belt. The limit switch 122 is released, while the limit switch 123 remains actuated. At the end of the forward travel of the carriage 81, the limit switch 121 is actuated;

Relay 140 is energized through the limit switch 121, closing contact 140A and opening contacts 140B and 140C. The relay 142, however, remains energized through contacts 131D and 142B. The blade supporting carriage meanwhile reaches the position corresponding to the beginning of the shearing operation, thereby actuating the limit switch 125 and, therefore, the relay 138. Actuation of the limit switch 125 de-energizes the remote control switch 139 and thus, stops the motor 13. The closing of the contact 138A as a result of the actuation of the relay 138 energizes the relay 135, since 138A is in series with normally closed contact 137A and presently closed contact 140A. Relay 135 closes contacts 135A and 135B. Relay 134 is energized through contact 135B, thus closing contact 134A and energizing electrovalve EV1. Electrovalve EV1 causes release of compressed air from the lower ends of the cylinders 3 and 4 with the simultaneous introduction of compressed air into the upper ends of these cylinders such that the ledger 7 is lowered so as to stop against the set screws 63 and 64 with the teeth 70' being pressed against the fabric. The limit switch 127 is released such that the relay 133 is de-energized opening the contact 133B and de-energizes the electrovalve EV4. As soon as the electrovalve EV4 is de-energized, compressed air is introduced into the cylinder 100 and the pin or rod 101 is pushed forward to release the limit switch 123, while the limit switch 126 is actuated; thus the relay 131 is energized, closing contacts 131A and 131B and opening contacts 131C and 131D;

Electrovalve EV2 is energized through contacts 131A and 135A, thus releasing compressed air from the lower portion of cylinder 30 and allowing the spring in the cylinder to rotate the blade 50 about its pivot 28, thereby pushing the blade 50 against the counter-blade 51 for the purpose of carrying out the shearing operation. Limit switch 128 is therefore closed, energizing the relay 132 which, in turn, closes the contact 132A and 132B;

Electrovalve EV3 is energized through the contacts 131B and 142A, thus controlling the release of pressure from the air bag 88 so as to open the clamp; thus, microswitch 129 is opened and the microswitch 130 is closed. The electrovalve EV5 is de-energized such that compressed air is released from the rear part of the cylinder 95 and introduced into the forward part thereof; as a result of the latter, the clamp supporting carriage 81 is moved backward and is brought into contact with the piston rod 101, the limit switch 121 being released and the limit switch 122 being actuated;

The relay 142 is energized through the limit switch 122, thus opening the contact 142A and de-energizing the electrovalve EV3; thus, the clamp is again closed, the microswitch 130 is released and the microswitch 129 is actuated;

Now, the remote control switch 136 is energized through contacts 137A, 132B, 137B and 139A. The remote control switch 136 energizes the motor 13 for the travel of the blade supporting carriage in the working direction and thus initiates the shearing of the fabric. The switch 136 closes the contact 136A and opens the contact 136B. The limit switch 125 is opened de-energizing the relay 138 which, in turn, opens the contact 138A and de-energizes relays 134 and 135. At the end of the shearing operation, the limit switch 124 is actuated, energizing the relay 137 so as to open contacts 137A and 137B to de-energize the remote control switch 136 and stop the motor 13. Actuation of the relay 137 also closes contacts 137C and 137D. Opening of contacts 135A and 136A will de-energize the electrovalve EV2 permitting the introduction of compressed air to the cylinder 30 with a consequent detachment of the blade 50 from the counter-blade 51. The limit switch 128 is released, the relay 132 is de-energized and thus, the electrovalve EV1 is de-energized; as a result of the latter, compressed air is released from the upper ends of the cylinders 3 and 4 and introduced to the lower ends thereof so as to lift the ledger 7 and disengage the teeth 70' from the fabric. The limit switch 126 is opened and the limit switch 127 is closed.

As it appears from the foregoing, the motor 13 is a three-phase alternating current motor with a squirrel cage rotor; the motor is reversible so as to move the carriage 20 in the two directions indicated, namely in a first direction of travel corresponding to the shearing operation and in a second direction of travel which is the reverse of the first to return the carriage to its initial starting position. Although the specific details of the electrical circuit for the motor per se are not shown, it should be understood that the two remote control switches 136 and 139 comprise means for actuating the motor to produce these two directions of movement. The remote control switch 136, when energized, actuates the motor to move the carriage in the shearing direction; the remote control switch 139, when energized, actuates the motor to return the carriage in the opposite direction to its initial starting position.

It should appear further from the foregoing description that the clamp is always closed when the ledger 7 is lifted; conversely, the ledger is always lowered when the clamp is open so that the fabric is not moved backward by the festooner (not shown) from which the fabric is supplied.

It has been stated above that the circular blade forms a small angle with respect to the plane of the rectilinear counter-blade during the shearing operation; preferably this angle will be between two degrees and five degrees.

The machine embodying the above described features of the present invention shows considerable advantages over those previously known. In fact, by rotating the circular blade at a peripheral speed slightly higher than its transverse speed along the rectilinear counter-blade, the shearing of the fabric is further facilitated because the fabric is pushed towards the point of instantaneous mutual contact between the two blades. Preferably the ratio between the peripheral speed of the circular blade and its traverse speed is less than 2.

A further advantageous feature of the present invention resides in the fact that the circular blade is rotated only during the shearing operation, the circular blade being idle during the backward travel of its supporting carriage; therefore, the circular blade occupies a different position at the beginning of each shearing operation such that the wear of the blade is more uniformly distributed along its entire perimeter.

Furthermore, it should be noted that the upper ledger does not press its weight against the fabric during the shearing operation but, rather, the task of maintaining the fabric stationary and flat during this operation is performed by an element which is pneumatically pressed against the fabric for its entire length; this arrangement has the advantage of insuring the pressure required for this purpose without causing the deformation of the fabric which would otherwise occur had it been subjected to the considerable weight of the upper ledger, thereby avoiding a serious and permanent disadvantage because the rubber in the fabric is in the uncured state and, therefore, plastic. Moreover, the adoption of this pneumatically pressed element allows a uniform distribution of pressure along the whole shearing line; on the other hand, the upper ledger, in view of its considerable length, is deflected in its central part and if it were brought into contact with the fabric, would press against the same in the central zone leaving the edges free.

It must also be noted that the particular shape of the pneumatically pressed element, including the provision of a lug extending as far as the proximity of the shearing line, permits the exertion of an uniform pressure on the fabric in the neighborhood of that line.

The fact that the counter-blade can be lifted during the feeding of the fabric to permit advancement of the conveyor belt coupled with the further fact that the counter-blade bears against the conveyor belt during the shearing operation prevents the conveyor belt from undergoing displacements in any direction while the fabric is sheared.

Another considerable advantage of the present invention resides in the fact that the orientatable clamp is actuated by a piston whose stroke is well defined and constant, and that the clamp moves the conveyor belt and the fabric simultaneously, thereby eliminating any possible longitudinal or transversal sliding between the fabric and the belt. Thus, it is possible to obtain a constant and exact correspondence between the length of the strip and its predetermined length because the clamp can always be disposed parallel to the shearing line, such that the clamp is, therefore, able to move the fabric and to accompany the same as far as the proximity of the shearing position for the entire length thereof.

The advancement of the fabric in the manner described above wherein there are avoided any transversal displacements of the fabric with respect to the conveyor belt is extremely important when shearing at small angle because in such cases even the smallest transversal displacement of the fabric can cause considerable variations in the size of the strip to be sheared. On the other hand, in normal practice, the advancement of the fabric is obtained only by acting on the conveyor belt such that the length of the supplied strip cannot always be constant.

Finally, the supplementary backward movement which is imparted to the calmp before starting the feeding operation facilitates the feeding of the fabric; the edge of the fabric has already been disengaged from the teeth 70' by means of the springs 71; however, it must be pointed out that the edge of the fabric is, nonetheless, somewhat tacky and might tend to adhere to the edge of the counter-blade 51. This supplementary backward movement, therefore, insures that the edge of the fabric will be completely detached from the shearing zone prior to the initiation of the feeding operation.

Whereas, the machine of the present invention has been described in particular relation to the drawings attached hereto, it should be understood that other and further modifications apart from those shown or suggested herein might be made within the spirit and scope of this invention.

We claim:

1. A machine for shearing sheet material, in particular sheet material reinforced with meal elements, at pre-established angles varying within a wide range, comprising a circular blade rotatable about its own axis and movable in a shearing direction, and a rectilinear counter-blade against which said rotatable blade is adapted to bear, said counter-blade having a flat top surface positioned to support the sheet material along the direction of and contiguous to the line of cut, means cooperating with said counter-blade surface for clamping the sheet material contiguous to the line of cut, the peripheral speed of the circular blade being slightly higher than its traverse speed and the plane of said circular blade forming a small angle with respect to the plane of the rectilinear blade, the axis of the circular blade remaining in a plane substantially perpendicular to the plane of the rectilinear blade and at a distance from the edge of the counter-blade which is smaller than the radius of said circular blade.

2. A machine as in claim 1 in which the ratio between the peripheral speed and the traverse speed of the circular blade is smaller than 2.

3. A machine as in claim 1 in which the angle formed by the plane of the circular blade with the plane of the rectilinear blade, with which it interferes, ranges between two degrees and five degrees.

4. A machine as claimed in claim 1 further comprising means for feeding the sheet material comprises a conveyor belt and wherein said counter-blade comprises means for positively securing said conveyor belt during cutting operations so that inadvertent movement of said conveyor belt is prevented.

5. A machine for shearing sheet material, in particular sheet material reinforced with metal elements, at pre-established angles varying within a wide range, comprising a circular blade rotatable about its own axis and movable in a shearing direction, and a rectilinear counter-blade against which said rotatable blade is adapted to bear, characterized in that the peripheral speed of the circular blade is slightly higher than its transverse speed, in that the plane of the circular blade forms a small angle with respect to the plane of the rectilinear counterblade the axis of the circular blade remaining in a plane substantially perpendicular to the plane of the rectilinear blade and at a distance from the edge of the counter-blade which is smaller than the radius of the circular blade, a flexible conveyor belt means extending upstream and downstream for feeding sheet material to be sheared and carrying away sheared sheet material, clamp means for intermittently advancing said belt, piston means operatively moving said clamping means, and material engaging means disposed in close proximity to said counter-blade for applying a uniform holding force across the entire width of the sheet material to prevent inadvertent movement of the material during the cutting operation, said material engaging means securing the material by exerting pressure on said counter-blade.

6. A machine for shearing sheet material, in particular sheet material reinforced with metal elements, at pre-established angles varying within a wide range, comprising a circular blade rotatable about its own axis and movable in a shearing direction, a rectilinear blade against which said rotatable blade is adapted to bear, a conveyor belt for the intermittent feeding of the sheet material to the shearing position represented by the zone of contact between said blades, a lower ledger orientable by rotation about a vertical axis and disposed below the conveyor belt, an upper ledger disposed above the conveyor belt and integral with the lower ledger during rotation thereof, said upper ledger being connected to said lower ledger by means for moving said upper ledger vertically with respect to said lower ledger, a carriage mounted on the upper ledger, means for moving said carriage in opposite directions along said upper ledger, said circular blade having a small rake on at least one of its plane surfaces and being mounted on said carriage, means to rotate said circular blade about its axis during the shearing operation at a peripheral speed slightly higher than the traverse speed of the carriage, said rectilinear counter-blade being mounted on the lower ledger, means to approach and push the circular blade against the rectilinear counter-blade in such a way that the axis of rotation of the circular blade is at a distance from the edge of the counter-blade which is smaller than the radius of the circular blade, and means to turn the circular blade about a practically vertical axis so that its plane forms a small angle with respect to the plane of the rectilinear blade with which it is in contact.

7. A machine for shearing sheet material, in particular sheet material reinforced with metal elements, at pre-established angles varying within a wide range, comprising a circular blade rotatable about its own axis and movable in a shearing direction, a rectilinear blade against which said rotatable blade is adapted to bear, a conveyor belt for the intermittent feeding of the sheet material to the shearing position represented by the zone of contact between said blades, a lower ledger orientable by rotation about a vertical axis and disposed below the conveyor belt, an upper ledger disposed above the conveyor belt, said upper ledger being integral with the lower ledger during rotation thereof and connected to said lower ledger by means for moving said upper ledger vertically with respect to said lower ledger, means vertically adjustable to limit the approaching travel of the upper ledger towards the lower ledger, means integral with the lower part of the upper ledger pneumatically pressed for their entire length to exert a uniform pressure on the fabric in the neighborhood of the shearing line and for its whole extension; a carriage mounted on the upper ledger, means to cause said carriage to travel in opposite directions along the upper ledger, said circular blade having a small rake on at least one of its plane surfaces and being mounted on said carriage, means to rotate said circular blade about its axis during the shearing operation at a peripheral speed slightly higher than the transverse speed of the carriage, said rectilinear counter-blade being disposed on the lower ledger, means to approach and push the circular blade against the rectilinear counter-blade in such a way that the axis of rotation of the circular blade is at a distance from the edge of the counter-blade which is smaller than the radius of the circular blade, and means to turn the circular blade about a practically vertical axis so that its plane forms a small angle with respect to the plane of the rectilinear blade with which it is in contact.

8. A machine as in claim 7 comprising means to maintain the upper ledger constantly parallel to itself during its vertical displacement.

9. A machine as in claim 8 in which the rectilinear counter-blade is slidably mounted into two vertical lateral guides, integral with the upper part of the lower ledger, and connected with the upper ledger.

10. A machine as in claim 7 comprising a clamp having a length at least equal to the length of the shear to be made and able to simultaneously clamp the conveyor belt and the fabric supported by it said clamp being orientable to clamp the fabric at different preselected angles within the plane of the fabric, pneumatic means to control the opening and the closing of said clamp, piston means to advance the clamp to the shearing position and to move it backward from said position for a length corresponding to that of the strip to be sheared.

11. A machine as in claim 10 comprising means to deviate the conveyor belt from the plane of the fabric and to pass it under said counter-blade along a line parallel to the shearing line, said means to deviate the conveyor belt being movable to maintain the deviating line constantly parallel to the cutting line which may assume any preselected angle with respect to the longitudinal direction of the fabric.

12. A machine as in claim 10 in which the means for controlling the lifting and the lowering of the upper ledger are synchronized with the means for controlling the opening and closing of the clamp so that the clamp is always closed when the upper ledger is lifted and said upper ledger is lowered when the clamp is open.

13. A machine as claimed in claim 10 wherein said means to rotate said circular blade about its axis is operative during the shearing operation and said means to rotate said circular blade is inoperative when said blade is not performing the shearing function.

14. A machine as in claim 10 comprising means for carrying out, after each shearing operation, a further backward movement of the clamp, supplementary to the movement corresponding to the length of the strip to be sheared, in order to cause the detachment of the edge of fabric which has remained adherent to the shearing zone before starting a new feeding cycle.

15. A machine as in claim 10 comprising two self-centering rollers for the conveyor belt downstream of the shearing position.

16. A machine as in claim 10 comprising electric limit switches for limiting the travel of the blade-supporting carriage in the two opposite diections and the advancement of the clamp in accordance with the length of the strip of fabric to be sheared.

References Cited by the Examiner

UNITED STATES PATENTS

| | | | |
|---|---|---|---|
| 852,964 | 5/07 | Koegel | 83—675 |
| 878,527 | 2/08 | Heil | 83—488 |
| 1,162,727 | 11/15 | Pickett | 83—277 |
| 1,888,744 | 11/32 | Shook | 83—488 X |
| 1,888,754 | 11/32 | Alexander et al. | 83—488 X |
| 2,381,571 | 8/45 | Buchan | 83—247 |
| 2,749,981 | 6/56 | MacKinnon et al. | 83—277 X |
| 3,072,004 | 1/63 | Jenkins | 83—488 X |
| 3,138,049 | 6/64 | Flory et al. | 83—461 |

FOREIGN PATENTS 441,648   1/36   Great Britain.

ANDREW R. JUHASZ, *Primary Examiner.*
LEON PEAR, *Examiner.*

UNITED STATES PATENT OFFICE
CERTIFICATE OF CORRECTION

Patent No. 3,207,019                      September 21, 1965

Marcello Vanzo et al.

It is hereby certified that error appears in the above numbered patent requiring correction and that the said Letters Patent should read as corrected below.

Column 3, line 18, for "later" read -- latter --; column 5, line 5, for "piper" read -- pipe --; column 9, line 26, for "angle" read -- angles --; line 33, for "calmp" read -- clamp --; line 52, for "meal" read -- metal --; column 10, line 14, for "transverse" read -- traverse --; line 16, for "counterblade" read -- counter-blade, --; column 11, line 15, for "transverse" read -- traverse --.

Signed and sealed this 27th day of September 1966.

SEAL)
Attest:

ERNEST W. SWIDER                      EDWARD J. BRENNER
Attesting Officer                      Commissioner of Patents